United States Patent [19]

Kunz

[11] Patent Number: 4,545,448
[45] Date of Patent: Oct. 8, 1985

[54] WEIGHING APPARATUS INCLUDING IMPROVED YOKE CONSTRUCTION

[75] Inventor: Peter Kunz, Gossau, Switzerland

[73] Assignee: Mettler Instrumente AG, Greifensee, Switzerland

[21] Appl. No.: 643,699

[22] Filed: Aug. 24, 1984

[30] Foreign Application Priority Data

Dec. 23, 1983 [CH] Switzerland .................. 6910/83

[51] Int. Cl.[4] .............................................. G01G 7/00
[52] U.S. Cl. ............................ 177/212; 177/210 EM
[58] Field of Search ....................... 177/210 EM, 212

[56] References Cited

U.S. PATENT DOCUMENTS

| | | | |
|---|---|---|---|
| 4,090,575 | 5/1978 | Kunz et al. | 177/210 EM |
| 4,311,202 | 1/1982 | Kunz | 177/212 |
| 4,337,838 | 7/1982 | Kunz | 177/212 |
| 4,429,757 | 2/1984 | Kunz | 177/212 |

*Primary Examiner*—George H. Miller, Jr.
*Attorney, Agent, or Firm*—Laubscher & Laubscher

[57] ABSTRACT

Weighing apparatus of the electromagnetic load compensation return-to-zero type including a vertically displaceable load support member to which is connected a load compensation coil arranged for movement in a stationary magnetic field, characterized in that the magnetic field is produced by at least one permanent magnet mounted in a hollow yoke structure defined by a pair of U-shaped yoke members each formed of a ferromagnetic material. The yoke members are arranged in opposed coaxial relation with their leg portions being parallel and extending toward each other. The yoke members are relatively angularly displaced about their common axis through an angle of 90°, the leg portions of one yoke member extending between the leg portions of the other member.

This design affords improved ease of assembly of the weighing apparatus and avoids the use of an additional magnet screen, thereby reducing the height of the yoke since the substantially enclosed hollow yoke structure has only a very small stray magnetic field.

6 Claims, 6 Drawing Figures

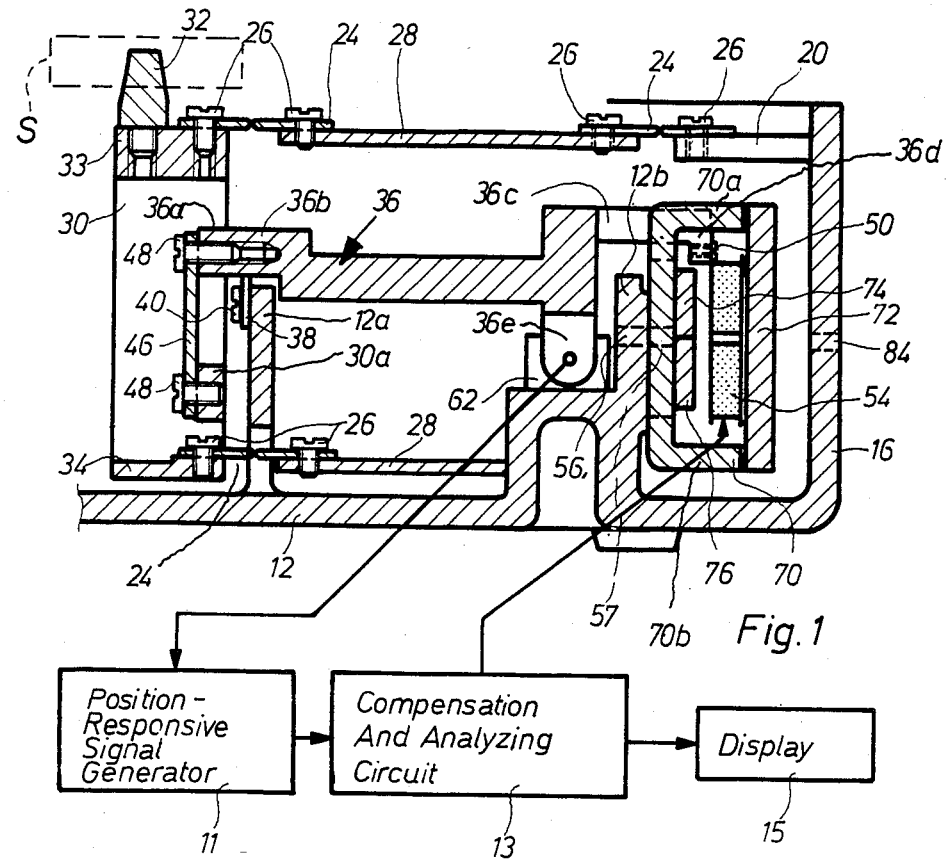
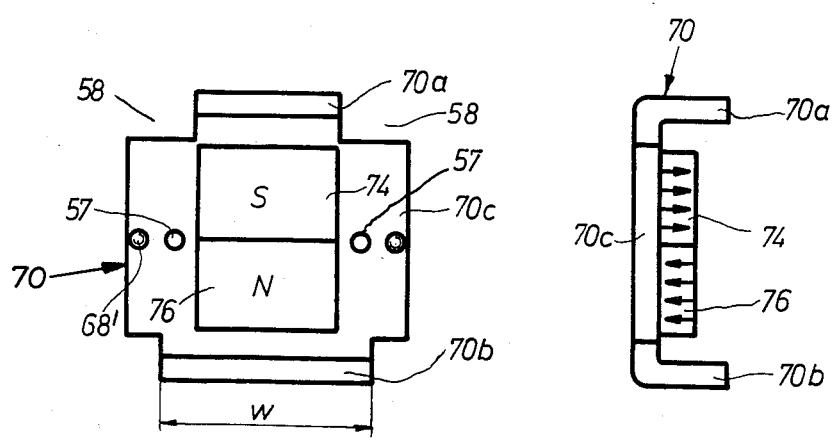
Fig. 1
Fig. 3
Fig. 4

WEIGHING APPARATUS INCLUDING IMPROVED YOKE CONSTRUCTION

BRIEF DESCRIPTION OF THE PRIOR ART

This invention relates to weighing apparatus of the load compensation return-to-zero type including a vertically displaceable load support member to which is connected a load compensation coil that is movable within a stationary permanent magnetic field defined by at least one permanent magnet mounted within a yoke structure. Examples of such known weighing systems are shown in the prior U.S. patents to Kunz Nos. 4,090,575, 4,311,202, and 4,429,757, among others (all assigned to the same assignee as the instant invention).

As shown in the aforementioned Kunz Pat. No. 4,429,757, it has been proposed to provide permanent magnet means including a partially open yoke system defined by a pair of identical L-shaped members. On the one hand, the openings of such a yoke construction provide improved temperature balance, while on the other hand, a relative large undesirable stray flux pattern is produced which necessitates the use of a relatively large magnetic screen outside the permanent magnet system to prevent undesirable coupling and reciprocable effects between the magnetic field and the surrounding environment (as might occur, for example, during the weighing of ferromagnetic objects). The use of such magnetic shields is shown, for example, in the prior Kunz et al U.S. Pat. No. 4,090,575.

The present invention was developed through efforts to improve the permanent magnet system in such a way that assembly of the components is simplified, together with the substantial elimination of stray magnetic fields, whereby the necessity for a magnetic shield or screen is eliminated.

SUMMARY OF THE INVENTION

Accordingly, a primary object of the present invention is to provide an improved weighing apparatus of the electromagnetic load compensation type in which the permanent magnet means for producing the stationary magnetic field includes ferromagnetic yoke means defined by a pair of yoke members each having a U-shaped configuration, said yoke members being arranged in opposed colinearly arranged relation with their leg portions extending in parallel relation toward each other. The yoke members are relatively angularly displaced through an angle of 90° the extremities of the legs of each yoke member terminating in abutting relation with the base portion of the other yoke member, whereby the yoke assembly is hollow and has retangular cross-sectional configurations in both the horizontal and vertical directions.

In the aforementioned Kunz Pat. No. 4,311,202, a hollow yoke system is proposed in which the four corners are provided with relatively large openings for assuring maximum ventilation of the yoke cavity. In situations where heat generation plays only a secondary role (as occurs, for example, when powerful magnets are used together with relatively small compensation currents), temperature compensation is much less of a consideration. For such cases, a preferred design is one in which the sheet metal parts contain at least one opening for receiving the coil carrier, the remainder of the yoke structure being essentially closed throughout.

The permanent magnet means includes one or more permanent magnets secured to the inner surface of the base portion of at least one of the yoke members. In the preferred embodiment, the lengths of the leg portions of one yoke member are less than the lengths of the legs of the other member, whereby upon assembly, it is possible in a simple manner to slide the yoke member without the permanent magnet member upon the yoke member carrying the permanent magnet without the leg portions producing any disturbing effects. In this regard, a difference of less than 1 mm between the lengths of the leg portions of the two yoke members is sufficient.

BRIEF DESCRIPTION OF THE DRAWING

Other objects and advantages of the invention will become apparent from a study of the following specification when viewed in the light of the accompanying drawing, in which:

FIG. 1 is a longitudinal sectional view of the improved weighing apparatus of the present invention taken along line 1—1 of FIG. 2;

FIGS. 3 and 4 are front and side elevation views, respectively, of one of the yoke members of the permanent magnet means of the apparatus of FIG. 1.

DETAILED DESCRIPTION

Figure 2:
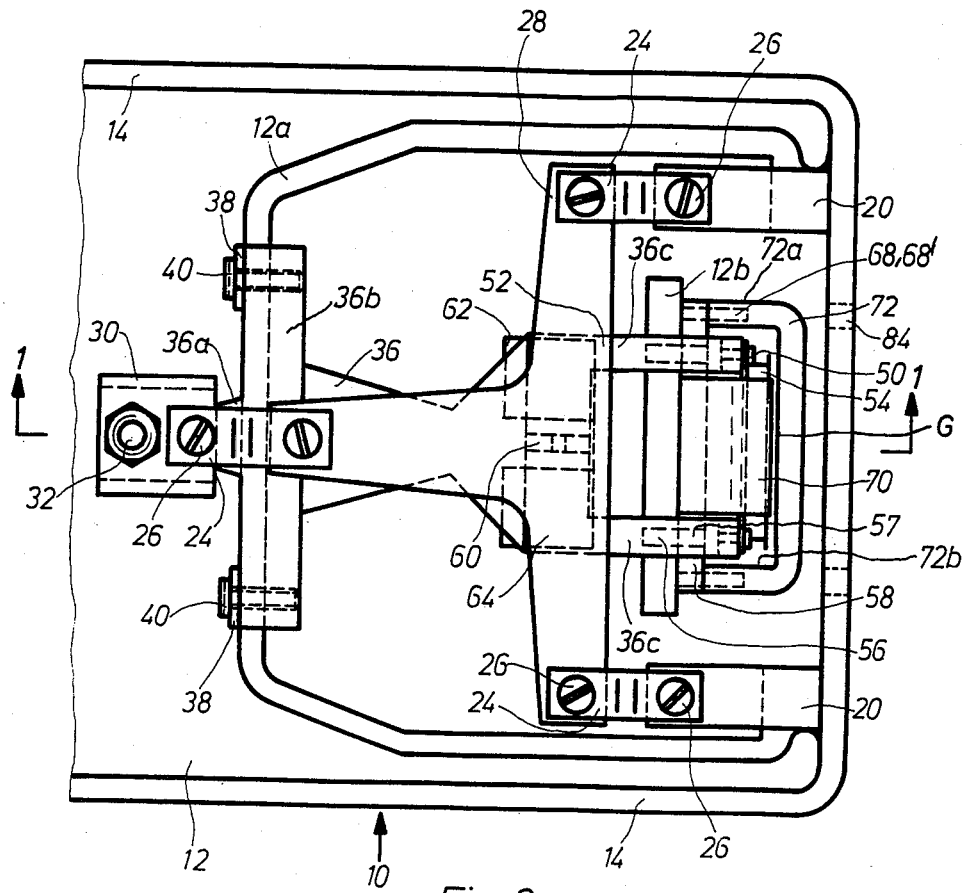
FIG. 2 is a top plan view of the weighing apparatus of FIG. 1.
Figures 5, 6:
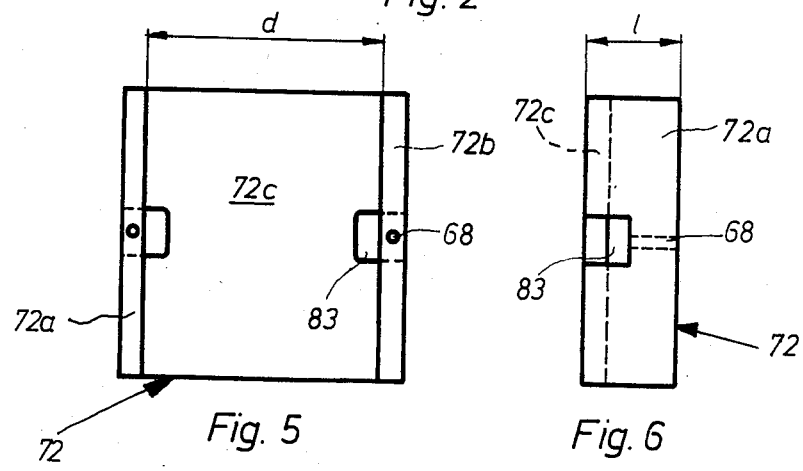
FIGS. 5 and 6 are front and side elevation views, respectively, of the other yoke member of the permanent magnet means.

Referring first more particularly to FIGS. 1 and 2, the weighing apparatus of the present invention is of the electromagnetic compensation return-to-zero type including a housing 10 formed of die-cast metal and including a bottom wall 12, a pair of side walls 14, and a pair of end walls 16. Integrally cast with the bottom wall is a generally U-shaped vertically extending rib portion 12a that is symmetrically arranged relative to the longitudinal axis of the housing. A second vertical rib portion 12b is formed integrally with the bottom wall adjacent and parallel with the rear end wall 16, which end wall is provided with a pair of internal integral lugs 20 symmetrically spaced on opposite sides of the longitudinal axis of the housing. A lower pair of integral lugs (not shown) are provided on the end wall 16 adjacent the bottom wall 12.

A vertical weighing pan support member 30 is provided that is guided for vertical movement relative to the housing by conventional parallelogram guide means including a pair of parallel vertically spaced T-shaped light metal guide members 28. The stem portions of the horizontal guide members are connected by flexible bearings 24 and screws to the upper and lower cross bar portions of the vertical support member 30, and the extremities of the arm portions of the guide members are connected by flexible bearings 24 and screws 26 to the upper and lower pairs of integral housing lugs 20, respectively. The conical pin 32 at the upper end of the vertical support member 30 is provided for supporting a conventional weighing pan S.

A weighing beam or two-arm lever 36 is provided that is pivotally connected intermediate its ends with the housing 10 for pivotal movement about a horizontal pivot axis. More particularly, the weighing beam includes adjacent one end 36a a transverse portion 36b that is connected on opposite sides of the longitudinal axis of the housing with the bottom wall rib portion 12a by a pair of vertically arranged flexible bearings 38 and screws 40. Te free extremity 36a of the weighing beam 36 is connected with the vertical support member 30 by the vertically arranged flexible bearing 46 and screws 48. At its other end, the weighing beam is bifurcated to define a pair of parallel longitudinally extending leg portions 36c that terminate in a pair of downwardly extending end portions 36d. Connected with the end portions 36d of the weighing beam by means of screws 50 is an annular load compensation coil 54 including a spool having a pair of copper end disks between which the coil wire is wound.

Conventional position sensing means are provided for determining when the weighing beam 36 is displaced—upon the application of a load to the weighing pan S—from its normal horizontal no-load position relative to the housing. More particularly, the weighing beam is provided adjacent its bifurcated end portion with a downwardly depending lug portion 36e that extends within the optical sensing zone of signal generating means 62 mounted on the housing bottom wall. As is known in the art, when the balance beam is displaced from its initial no-load position, a position sensing signal is transmitted by the signal generating means 11 to the compensation and analyzing means 13 that supplies compensation current to the coil 54 for producing an electromagnetic force in the stationary magnetic field produced by the permanent magnet means thereby to return the balance beam to its initial no-load position. The magnitude of the compensation current—which is a function of the magnitude of the load applied to the weighing pan—is indicated on the visual display 15.

The permanent magnet means comprises a pair of permanent magnets 74 and 76 that are vertically arranged relative to each other and are magnetized in opposite horizontal directions as shown diagramatically in FIG. 4. The permanent magnet means also includes a pair of generally U-shaped soft iron ferromagnetic yoke members 70 and 72 having horizontal leg portions 70a,70b and 72a,72b, respectively, and vertically arranged base portions 70c and 72c, respectively. The yoke members are arranged colinearly with their leg portions extending toward each other, the yoke members being relatively angularly displaced through an angle of 90° relative to each other. The widths of the leg portions 70a and 70b of the yoke member 70 are less than the spacing distance d between the legs of the yoke member 72, whereby the leg portions of the yoke member 70 extend between the leg portions of the yoke member 72, whereby the yoke means has a hollow cross sectional configuration. The base portion 70c of the yoke member 70 is connected with vertical integral rib portion 12b by screws that extend through aligned screw-threaded bores 56 and 57 contained in the integral rib portion 12b and in the base portion of the yoke member 70, respectively. The permanent magnets 74 and 76 are adhesively secured to the inner face of the base portion 70c of the yoke member in symmetrical relation to the axis of compensation coil 54 when the balance beam 36 is in the initial no-load position, whereby the magnet forces created by the oppositely-magnetized permanent magnets produce equal resultant forces in the upper and lower portions of the coil 54. The upper portion of the yoke member 70 contains a pair of notches 58 (FIG. 3) that receive the bifurcated arm portions 36c of the balance beam 36, as shown in FIG. 2.

During assembly, the permanent magnets 72 and 74 are adhesively secured to the base portion of the yoke member 70 and the yoke member 70 is connected with the integral rib 12b by screws extending through aligned bores 56 and 57, whereupon the balance beam of two-arm lever member 36 is inserted with coil 54 being contained within the yoke member 70. The other yoke member 72 is then slid downwardly with the extremities of its leg portions 72a and 72b in engagement with the base portion 70c of the yoke member 70. In accordance with an important structural feature of the invention, the lengths l of the legs of yoke member 72 are greater than the corresponding lengths of yoke member 70, so that a gap G (FIG. 2) of about 0.5 mm is provided between the extremities of the legs of the yoke 70 and the base portion of the yoke member 72. Finally, the two yoke members 70 and 72 are screwed together by screws that extend through bores 68 and 68', access to the screws being provided by the accesses 83 (which access openings are subsequently filled with plastic plugs or the like).

What is claimed is:

1. In an electromagnetic load-compensation weighing apparatus of the type including a housing (10), means (70,72,74) defining a stationary magnetic field in said housing, a movable load support member (30) mounted in said housing, and load compensation means including position sensing means (62) connected with the housing for detecting displacement of the load support member from an initial no-load position, and a load compensation coil (54) connected with said member and arranged for displacement in the magnetic field, whereby compensation current supplied to the coil reacts with the field of the permanent magnet means to apply to the load support member a restoring force for displacing the load support member toward its initial no-load position;

the improvement wherein said means defining said stationary magnetic field comprises (a) hollow ferromagnetic yoke means connected with said housing, said yoke means including a pair of U-shaped yoke members (70,72) arranged colinearly in opposed relation with the leg portions thereof extending toward each other, said yoke members being relatively angularly displaced about their longitudinal axes through 90° with the leg portions (70a,70b) of each yoke member (70) extending in parallel relation relative to the leg portions (72a, 72b) of the other yoke member (72) and terminating adjacent the base portion (70c,72c) of the other yoke member; and (b) permanent magnet means (74,76) secured within said yoke means for establishing a flux path therethrough;

(c) said load compensation coil being arranged within said yoke means and being connected with said load support member for movement within said stationary magnetic field.

2. Apparatus as defined in claim 1, wherein said load support member (30) is connected to the load compensation coil (54) by means of a balance beam (36).

3. Apparatus as defined in claim 2, wherein said yoke means contains at least one opening (58) through which an end portion (36c) of said balance beam extends, and means (50) connecting said compensation coil with said balance beam end portion.

4. Apparatus as defined in claim 2, wherein said balance beam (36) includes at one end a bifurcated portion defining a pair of parallel axially extending arm portions (36c) that extend through corresponding openings (58) contained in said yoke means, respectively, said arm portions terminating in downwardly extending extremities (36d) to which the compensation coil is connected.

5. Apparatus as defined in claim 1, wherein the base portions of the yoke members are vertical and the leg portions of said yoke members are horizontal; wherein said permanent magnet means (74, 76) are horizontally magnetized and are secured to the inner surface of the base portion of one of said yoke members; and further wherein the widths (w) of the leg portions (70a, 70b) of said yoke member are less than the distance (d) between the leg portions of the other yoke member, the legs of said first yoke member extending between the legs of the other yoke member, whereby the chamber defined within said yoke means is substantially enclosed.

6. Apparatus defined in claim 5, wherein the leg portions (70a, 70b) of said one yoke member (70) are slightly shorter than the leg portions (72a, 72b) of the other yoke member (72), whereby the latter may freely slide on said one yoke member (70) during mounting.

* * * * *